UNITED STATES PATENT OFFICE.

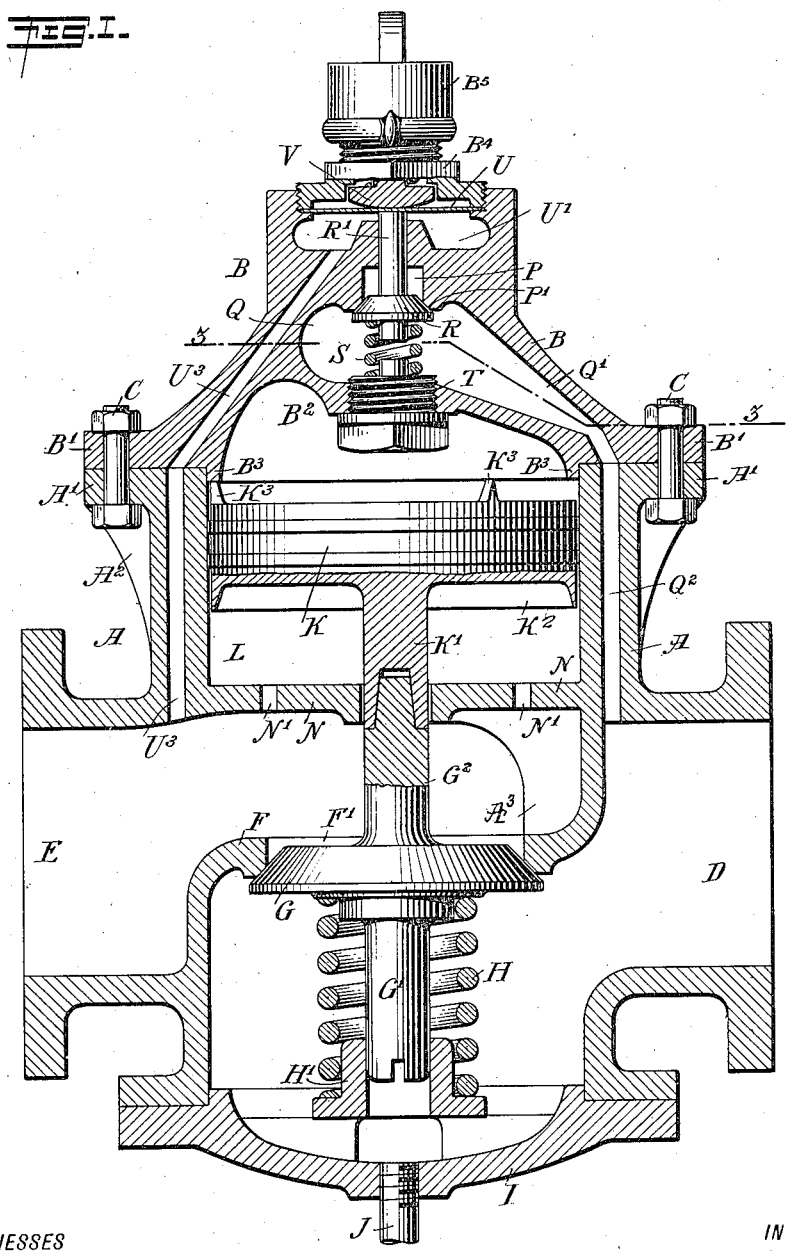

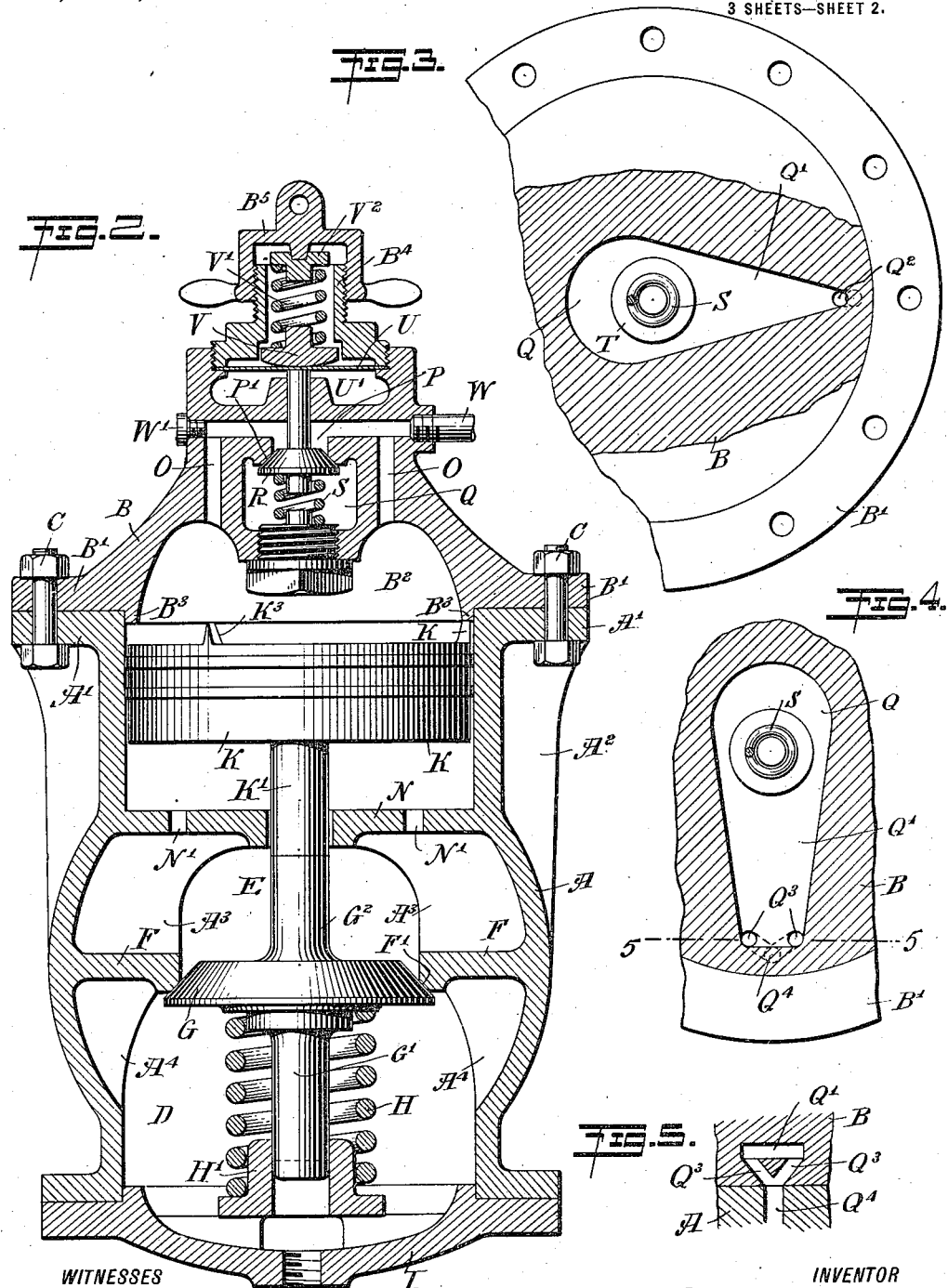

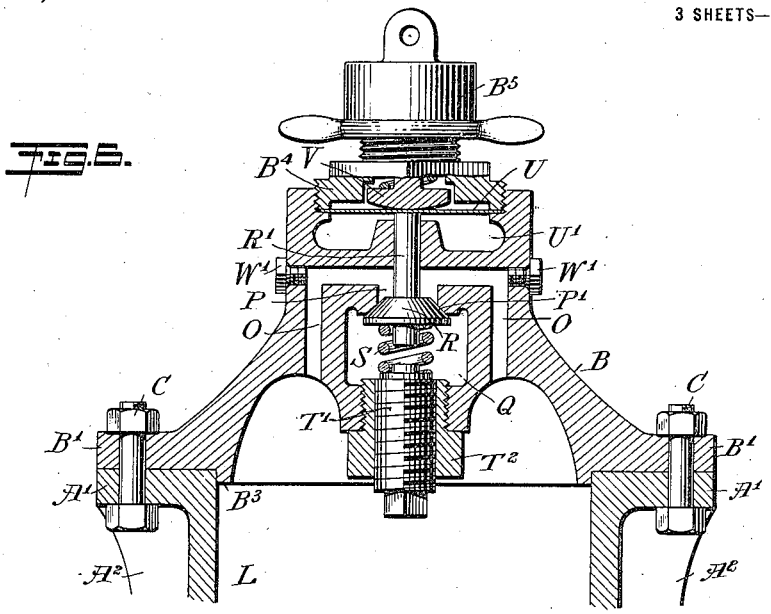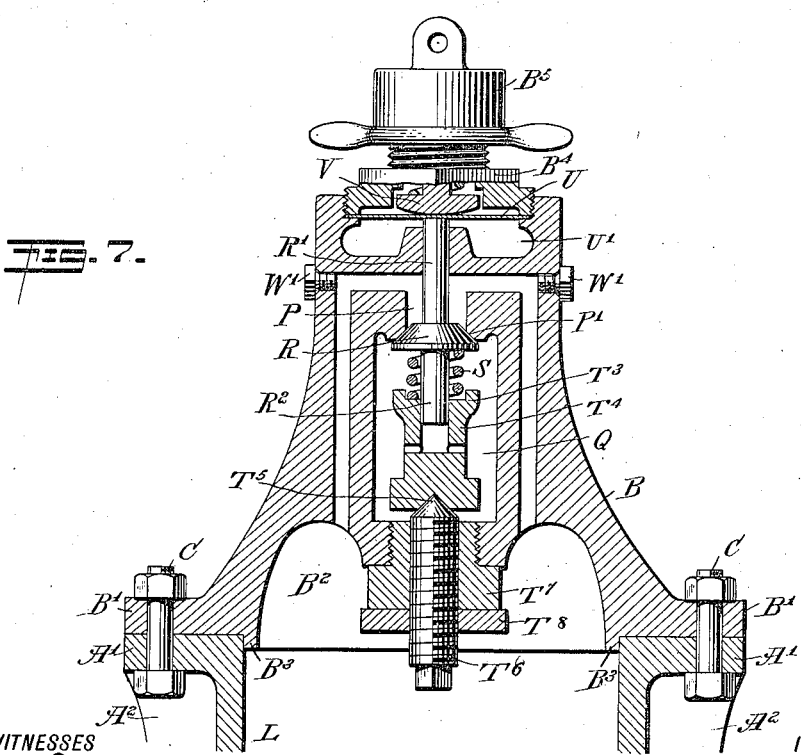

JULES P. METZGER, OF CARLSTADT, NEW JERSEY, ASSIGNOR TO THE LESLIE COMPANY, OF LYNDHURST, NEW JERSEY, A CORPORATION OF NEW JERSEY.

PRESSURE-REGULATOR.

1,173,834.   Specification of Letters Patent.   Patented Feb. 29, 1916.

Application filed October 9, 1913. Serial No. 794,258.

*To all whom it may concern:*

Be it known that I, JULES P. METZGER, a citizen of the Republic of France, and a resident of Carlstadt, in the county of Bergen and State of New Jersey, have invented a new and Improved Pressure-Regulator, of which the following is a full, clear, and exact description.

The invention relates to pressure regulators in which a main or regulating valve is controlled by a piston governed by controlling means controlled by low pressure from the outlet side of the regulator to admit high pressure from the inlet side of the regulator.

An object of the present invention is to provide a new and improved pressure regulator arranged to insure proper and easy working of the parts under all conditions, to render the regulator exceedingly sensitive to fluctuations in the pressure of the fluid, and to prevent the working parts from being thrown out of alinement, thus reducing leakage to a minimum.

In order to accomplish the desired result use is made of a casing having an inlet, an outlet, and a partition intermediate the said inlet and the said outlet, the partition having a valve seat, a spring-pressed regulating valve controlling the said valve seat, a cylinder in the upper portion of the said casing and in communication at its lower end with the said outlet, a piston in the said cylinder and connected with the regulating valve, a high pressure expansion chamber located above the said cylinder and having its bottom connected by a downwardly-extending port with the said inlet to allow fluid pressure to pass from the said inlet into an expansion chamber to expand therein and to drain the said expansion chamber of the water of condensation, the roof of the said expansion chamber being provided with a valve seat, a controlling valve controlling the said valve seat of the high pressure chamber, ports connecting the said valve seat with the upper end of the said cylinder, a diaphragm chamber above the said high pressure expansion chamber and connected with the said outlet, a diaphragm controlling the said controlling valve, and a pressure device bearing on the said diaphragm. Use is also made of external vertically-disposed ribs arranged on the upper part of the casing and internal vertically-disposed ribs extending from the partition to the bottom of the cylinder to reinforce the casing with a view to hold the valve and piston in true alinement with each other and with the seat of the cylinder, thus insuring a true working of the said valve and piston.

A practical embodiment of the invention is represented in the accompanying drawings forming a part of this specification, in which similar characters of reference indicate corresponding parts in all the views.

Figure 1 is a longitudinal central section of the pressure regulator; Fig. 2 is a transverse section of the same; Fig. 3 is a sectional plan view of the same on the line 3—3 of Fig. 1; Fig. 4 is a similar view of a modified form of the same; Fig. 5 is a cross section of the same on the line 5—5 of Fig. 4; Fig. 6 is a cross section of a modified form of the support for the spring of the controlling valve; and Fig. 7 is a similar view of another modified form of the spring support for the controlling valve.

The casing A of the pressure regulator is provided with a cap B having a flange B' resting on a flange A' of the said casing, the flanges being fastened together by suitable bolts C. The casing A is provided with an inlet D connected with a source of fluid pressure supply, and the casing is further provided with an outlet E for conducting the fluid under reduced pressure to other machinery, apparatus or devices. A horizontal partition F is arranged within the casing intermediate the inlet D and the outlet E and the said partition F is provided with a valve seat F' controlled by a main regulating valve G held to its seat by a spring H seated at its lower end on a seat H' forming part of or attached to a bottom cap I secured to the under side of the casing A. A drain pipe J leads from the bottom cap I to carry off the water of condensation to a suitable place of discharge. The seat H' also forms a guide for the depending valve stem G' to guide the valve G in its opening and closing movements.

The valve G is provided with an upwardly-extending stem $G^2$ screwed or otherwise secured to the stem K' or a piston K mounted to reciprocate in a cylinder L formed in the upper portion of the casing A and separated from the outlet E by a horizontal partition N having openings or ports N' to connect the lower end of the cylinder L with the outlet E. The upper end of the cylinder L is closed by the cap B, which latter is provided at the under side with a recess B² in register with the upper end of the cylinder L.

In pressure regulators of the class described it sometimes happens that the piston becomes disengaged from the main valve through various causes, and the piston is liable to abut against the top cap B, and the bottom of the piston is liable to be seated on the partition or bridge N. A sudden starting or shutting off of the steam might produce such results. When this is the case, the exposed surface of the piston to the steam is reduced and the downward flow of the steam is diminished accordingly while a contrary effect takes place with the same condition and with the ordinary form of piston at the bottom; in other words, the equilibrium of the device in relation to the main valve G by the difference of predetermined exposed area is disturbed. To overcome this defect the following arrangement is made: The cap B is provided at the recess B² with an annular flange or shoulder B³ fitting into the upper end of the cylinder L. In order to prevent the piston K from being flatly seated on the partition N use is made of a depending rim K² having a sharp bottom edge adapted to be seated on the top of the partition N so as to allow the pressure from the outlet E to act on the full area of the under side of the piston K. The top of the piston K is provided with pointed lugs K³ adapted to abut against the under side of the shoulder B³ to allow the high pressure in the upper end of the cylinder L and the recess B² to act on the full area of the top of the piston K.

The recess B² is connected by ports O (see Fig. 2) with a chamber P arranged in the cap B and provided at the under side with a valve seat P′ opening into an expansion chamber Q formed in the cap B above the recess B². The valve seat P′ is normally closed by a controlling valve R extending within the expansion chamber Q and pressed to its seat by a spring S seated on top of a screw plug T screwing in the bottom of the expansion chamber Q.

Defective pressure regulation is frequently due to condensation taking place in the chamber Q and obstructing the proper working of the controlling valve R. The pressure regulator works fairly well as long as the conditions are normal and the fluid, namely, steam, is absolutely dry but whenever moist steam through various conditions which occur in practice passes into the chamber Q then the controlling valve R is liable to flutter and its sensitiveness is impaired and faulty regulation results. In order to overcome this the following arrangement is made: The expansion chamber Q is provided with an entrance Q′ sloping downwardly and connected at its lower end with a port Q² opening into the inlet D to allow high pressure fluid to pass from the said inlet into the expansion chamber Q. The side walls of the entrance Q′ are diverging from the port Q² to merge with the side wall of the expansion chamber Q, which is preferably made circular, as plainly indicated in Fig. 3, and which is of sufficient size to allow a gradual expansion of the steam as the same passes by way of the port Q² and the gradually enlarging entrance Q′ into the expansion chamber Q. It will be noticed that by the arrangement described any water of condensation that may form in the expansion chamber Q is readily drained out of the same by the sloping entrance Q′ and the port Q² to prevent such water of condensation from interfering with the proper working of the controlling valve R. It will further be noticed that by this arrangement dry steam is had in the chamber Q and this dry steam only passes into the upper end of the cylinder L by way of the valve seat P′ and ports O whenever the controlling valve R is opened, as hereinafter more fully explained. It will further be noticed that by providing a large expansion chamber a large volume of dry steam is accommodated and hence when the controlling valve is opened the steam supply is ample and the steam passes quietly through the open valve seat thus avoiding injury to the seat by erosion.

The upwardly-extending stem R′ of the controlling valve R is engaged at its upper end by a diaphragm U held in a diaphragm chamber U′ arranged in the top of the cap B and connected by a port or opening U³ with the outlet E. The diaphragm U is fastened in position by a nipple B⁴ and the top of the diaphragm is pressed on by a button V on which rests the lower end of a spring V′ engaged at its top by a button V² resting on the under side of a cap B⁵ screwing on the nipple B⁴. By screwing the cap B⁵ down or up more or less tension is given to the spring V′ according to the difference in pressure to be had between the fluid at the inlet D and at the outlet E.

When the valve is in use and the pressure at the outlet E falls below a predetermined reduced pressure then the spring V′ forces the diaphragm U downward whereby the controlling valve R is opened to allow high pressure to pass by way of the inlet D, port Q², entrance Q′ chamber Q, valve seat P′, chamber P and ports I into the recess B² and into the upper end of the cylinder L to force the piston K downward therein so that the main or regulating valve G is opened against the tension of its spring H. Fluid pressure can now pass from the inlet D by way of the valve seat F′ into the outlet E and as soon as the desired gage pressure is reached the diaphragm U is returned to former position to allow the valve R to close by the action of its spring S whereby the fluid pressure is cut off from the upper end of the cylinder L and consequently the pressure passing into the lower end of the cylinder L by way of the ports N' causes a return of the piston K and the valve G aided by the spring H.

It is understood that when the controlling valve R closes, the steam above the piston K has free access by way of the ports O to the chamber P from which the steam can pass by way of leakage along the loose fitting stem R' into the diaphragm chamber U' at the outlet side of the valve. It will also be noticed that part of the steam trapped in the upper end of the cylinder L condenses and leaks past the piston K into the lower part of the said cylinder. Thus the pressure in the upper end of the cylin- moves upward and thereby moves the valve G to its seat F' aided by the spring H.

An emergency pipe W is connected with one of the ports O and this pipe W is connected with a source of pressure supply to allow of passing high pressure directly into the upper end of the cylinder L to force the piston K downward therein with a view to open the valve G in case the controlling valve R fails to operate for one reason or another. The emergency supply pipe W can be attached to either side of the cap B, the opposite port O being closed by a screw plug W', as indicated in Fig. 2.

In the use of pressure regulators of the type referred to it is of importance that the casing including the cylinder and bottom cap, piston, main valve and controlling valve are in true axial alinement to insure proper working of the moving parts and to render the regulator exceedingly sensitive to the fluctuations of the pressure of the fluid passing through the regulator. Strains in the line of pipe to which the pressure regulator is attached tend to distort or warp the casing so that the working parts are thrown out of axial alinement. In large pressure regulators the strains referred to are considerable and the moving parts are heavy and the slightest defect in the alinement causes undue friction of the working parts thus preventing the latter from working freely. In order to overcome these defects the following arrangement is made: The casing A is reinforced by the use of vertically-disposed ribs $A^2$ arranged on the outside of the casing and extending from the under side of the flange A' to a point approximately opposite the partition F. The ribs $A^2$ are arranged radially relative to the common axis of the piston K and the valve G. Similar ribs $A^3$ are arranged interiorly of the casing A and extend between the partitions N and F, as will be readily understood by reference to Figs. 1 and 2. The lower portion of the casing A is reinforced by similar ribs $A^4$ depending from the under side of the partition F. By the arrangement described the casing is not liable to be warped and a true fitting of the valve G on the valve seat F' is maintained to insure easy working of the parts and to render the regulator exceedingly sensitive to fluctuations in pressure.

In the modified form shown in Figs. 4 and 5, the lower end of the entrance Q' of the expansion chamber Q is connected by two branch ports $Q^3$ with the ports $Q^4$ leading into the inlet D. By this arrangement the steam begins to expand as soon as it reaches the upper end of the port $Q^4$ and in case one of the branch ports $Q^3$ should become clogged up the rest will still be in service for supplying dry steam to the expansion chamber Q.

In the modified form shown in Fig. 6, the support for the spring S of the controlling valve R is in the form of a screw rod $T'$ which screws in a screw plug $T^2$ screwing in the bottom of the expansion chamber Q. It will be noticed that the screw plug T shown in Figs. 1 and 2 as well as the screw plug $T^2$ shown in Fig. 6 extends with its upper end a distance above the bottom of the expansion chamber Q so as to prevent lodgment of water of condensation in the said chamber. By the use of the screw rod T' the tension of the spring S may be conveniently regulated, it being understood that access to the screw rod T' is had at the time the cap B is removed from the casing A.

In the modified form shown in Fig. 7 the spring S of the controlling valve R is seated in a seat $T^3$ arranged in the top of a support $T^4$ provided in its lower end with a central cone-shaped recess engaging a conical point $T^5$ formed on the upper end of a screw rod $T^6$ screwing in a screw plug $T^7$ screwed into the bottom of the expansion chamber Q. The support $T^4$ besides forming a seat for the spring S also forms a guide for the depending stem $R^2$ of the controlling valve R. By adjusting the screw rod $T^6$ the tension of the spring S may be increased or diminished. After the spring S has been set the screw rod $T^6$ is locked in place by a jam nut $T^8$ abutting against the under side of the screw plug $T^7$.

It is understood that close regulation in a regulator as described depends in a great measure upon the sensitiveness of its flexible parts especially the spring S and diaphragm U for the controlling valve R, and if the ratio of reduction is great a greater degree of sensitiveness between the flexible diaphragm and the controlling valve is of great advantage. By freeing the spring S of deleterious influences of moist steam and water of condensation and by allowing setting of the spring S to the desired tension it is possible to use an exceedingly thin, sensitive diaphragm U and consequently the controlling valve is rendered very sensitive in its opening and closing movements.

In the operation of the pressure regulator the controlling valve R opens to allow fluid pressure from the inlet D to pass into the upper end of the cylinder N to force the piston K downward so that the main valve G opens to allow the fluid pressure to pass by way of the inlet D and valve seat F' to the outlet E, and the valve G remains open until the outlet pressure equals the desired gage pressure. Should the demand for fluid pressure on the outlet E increase then the tendency would be to diminish the pressure on the outlet and under the diaphragm, but when this takes place the controlling valve R opens correspondingly more fully whereby more fluid pressure is admitted to the upper end of the cylinder L to force the piston K farther down so that the valve G is opened more fully to supply the demand for more fluid pressure at the outlet E. Should the outlet delivery be stopped suddenly the reverse action takes place, that is, the pressure under the diaphragm U forces the latter up to allow the spring S to close the controlling valve R and thus shut off the fluid pressure for the upper end of the cylinder L. The pressure on the under side of the piston K moves the latter upward to close the valve G.

From the foregoing it will be seen that no matter what the demand for fluid pressure is at the outlet E, the regulator satisfies such demand.

Having thus described my invention, I claim as new and desire to secure by Letters Patent:

1. A pressure regulator of the class described, comprising a casing having an inlet and an outlet, a spring pressed regulating valve between the inlet and outlet, a piston connected to the valve, a cylinder located above the valve and in which the piston works, an expansion chamber located above the cylinder and having an entrance at one side connected by a downwardly extending port with the inlet, ports leading from the top of the said expansion chamber and opening into the upper end of the piston cylinder, a valve seat formed in the roof of the expansion chamber around the ports, a vertically disposed valve controlling the said ports and seated on the said seat within the expansion chamber, the said expansion chamber being substantially circular in form and extending around its valve and the said entrance thereto having its side walls diverging away from the said inlet port and its top and base sloping downwardly toward the said inlet port, the said base sloping downwardly from the lowest point of the expansion chamber whereby to entirely drain the same of water of condensation, and means for controlling the expansion chamber valve and in turn controlled by pressure from the outlet.

2. A pressure regulator of the class described, comprising a casing having an inlet, an outlet and a partition intermediate the said inlet and outlet, the partition having a valve seat, a spring-pressed regulating valve controlling the said valve seat, a cylinder in the upper portion of the said casing and in communication at its lower end with the said outlet, a piston in the said cylinder and connected with the regulating valve, a high pressure expansion chamber located above the said cylinder and having its bottom connected by a downwardly-extending port with the said inlet to allow fluid pressure to pass from the said inlet into the said expansion chamber and to drain the said expansion chamber of water of condensation, the roof of the said expansion chamber being provided with a valve seat, the under side of which is below the roof of the said expansion chamber, a vertically disposed controlling valve controlling the said roof valve seat of the high pressure expansion chamber, ports connecting the said valve seat with the upper end of the said cylinder, a diaphragm chamber above the said high pressure expansion chamber and connected with the said outlet, a diaphragm controlling the said controlling valve, and a pressure device bearing on the said diaphragm.

3. A pressure regulator of the class described, comprising a casing having an inlet, an outlet and a partition intermediate the said inlet and outlet, the partition having a valve seat, a spring-pressed regulating valve controlling the said valve seat, a cylinder in the upper portion of the said casing and communicating at its lower end with the said outlet, a piston in the said cylinder and connected with the regulating valve, a high pressure expansion chamber located above the said cylinder and having its bottom connected by a downwardly-extending port with the said inlet to allow fluid pressure to pass from the said inlet into the said expansion chamber and drain the said expansion chamber of water of condensation, the said expansion chamber being approximately circular in form and having a downwardly sloping entrance, the side walls of the entrance being diverging and merging with the side wall of the expansion chamber, the upper end of the port connected with the said inlet having a plurality of branches opening into the contracted end of the said sloping entrance, the roof of the said expansion chamber being provided with a valve seat, a vertically disposed controlling valve controlling the said roof valve seat of the high pressure expansion chamber, ports connecting the said valve seat with the upper end of the said cylinder, a diaphragm chamber above the said high pressure expansion chamber and connected with the said outlet, a diaphragm controlling the said controlling valve, and a pressure device bearing on the said diaphragm.

4. A pressure regulator of the class described, comprising a casing having an inlet, an outlet and a partition intermediate the said inlet and outlet, the partition having a valve seat, a spring-pressed regulating valve controlling the said valve seat, a cylinder in the upper portion of the said casing and in communication at its lower end with the said outlet, a piston in the said cylinder and connected with the regulating valve, a high pressure expansion chamber located above the said cylinder and having its bottom connected by a downwardly-extending port with the said inlet to allow fluid pressure to pass from the said inlet into the said expansion chamber and drain the said expansion chamber of water of condensation, the roof of the said expansion chamber being provided with a valve seat, a vertically disposed controlling valve controlling the said roof valve seat of the high pressure chamber, a spring in the said expansion chamber and pressing the said controlling valve to its seat, a support in the said expansion chamber and having a seat for the said springs to rest on, the said support forming a guide for the stem of the controlling valve, a screw plug in the bottom of the said expansion chamber and a screw screwing in the said screw plug and having a pointed end extending into the expansion chamber, the said pointed end engaging the bottom of the said support, ports connecting the said valve with the upper end of the said cylinder, a diaphragm chamber above the said high pressure expansion chamber and connected with the said outlet, a diaphragm controlling the said controlling valve, and a pressure device bearing on the said diaphragm.

5. A pressure regulator of the class described, comprising a casing, having an inlet, an outlet and a partition intermediate the said inlet and outlet, the partition having a valve seat, a spring-pressed regulating valve controlling the said valve seat, a cylinder in the upper portion of the said casing and in communication at its lower end with the said outlet, a piston reciprocating in the said cylinder, controlling means controlled by pressure from the said outlet to connect the said inlet with the upper end of the said cylinder, and an emergency feed connection connected directly with the upper end of the said cylinder.

In testimony whereof I have signed my name to this specification in the presence of two subscribing witnesses.

JULES P. METZGER.

Witnesses:
 THEO. G. HOSTER,
 PHILIP D. ROLLHAUS.